Patented May 11, 1954

2,678,313

UNITED STATES PATENT OFFICE 2,678,313

STABLE MOLECULAR COMPOUNDS OF 5-PHENYL - 5 - ETHYL - BARBITURIC ACID WITH 1 - PHENYL - 2 - AMINOPROPANES

Otto Schnider, Basel, Switzerland, assignor to Hoffmann-La Roche Inc., Nutley, N. J., a corporation of New Jersey No Drawing. Application October 25, 1950, Serial No. 192,153

Claims priority, application Switzerland November 9, 1949

5 Claims. (Cl. 260—258)

The present invention relates to stable homogeneous compounds containing in equimolecular proportions 5-phenyl-5-ethyl-barbituric acid and a base of the general formula

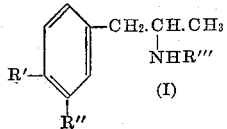

wherein R', R'' and R''' stand for hydrogen or methyl.

More particularly the invention is concerned with stable homogenous compounds consisting of 5-phenyl-5-ethyl-barbituric acid and a base, such as 1-phenyl-2-amino-propane, 1-(3',4'-dimethyl-phenyl)-2-amino-propane, 1 - phenyl-2-methyl-amino-propane, 1-(4'-methyl - phenyl) - 2-amino-propane and the like.

Said compounds are obtained by reacting together, with or without a solvent, equimolecular amounts of 5-phenyl-5-ethyl-barbituric acid and of a 1-phenyl-2-amino-propane of the above general formula. To this end, mere fusion of the components or heating thereof in water is sufficient. They may also be dissolved by heating in a suitable solvent, whereupon the new compounds precipitate during cooling in form of well developed crystals; suitable solvents are for instance: alcohols, such as methanol or ethanol, acetone, ethyl acetate, ether, chloroform and others. According to another modification of the process, the components may be dissolved in an organic solvent which is miscible with water, such as methanol or ethanol, acetone, dioxane, and the solution obtained added with water until it begins to become turbid. The same compound may also be formed by reacting a salt of the compound of formula I with a salt of 5-phenyl-5-ethyl-barbituric acid. In each instance the yield is nearly quantitative. The end products contain the two components in a molecular proportion of 1:1, independently of the one or the other component having been added in excess.

The new compounds crystallize—partly with, partly without water of crystallization—in form of colorless and well developed crystals. Said crystals are only slightly soluble in water, but they are easily soluble in organic solvents. They are not decomposed into the components by repeated dissolution in neutral solvents and they may therefore be recrystallized without any special care. The solutions have a neutral reaction and the dry compounds are unlimitedly stable, even when exposed to the air. Since these compounds are particularly stable and difficultly soluble in water the resorption thereof in the living organism is slow. On animals they are active in small doses against the cardiazol shock. The toxicity of the 5-phenyl-5-ethyl-barbituric acid in these novel compounds is very low and its hypnotic effect is compensated to a great extent by the base component. The novel preparations are therefore well suited for the treatment of epilepsy. The two components help each other in causing the desired effect and exert also a favorable mutual influence upon the properties of the single components which are undesirable for the treatment of epilepsy. In view of the low toxicity and of the absence of any hypnotic effect, it is possible to use a high dose of said novel compounds.

Example 1

A solution of 135 parts by weight of 1-phenyl-2-amino-propane in 135 parts by volume of ethanol is poured into a solution of 232 parts by weight of 5-phenyl-5-ethyl-barbituric acid in 700 parts by volume of ethanol. Water is added until the solution begins to become turbid, 700 parts by volume being needed to this end. Crystallization starts immediately. After standing in ice for several hours, the crystals are separated by filtration. A practically quantitative yield of the new compound is obtained. The product melts at 167–168° C. It is difficultly soluble in water in which it shows a neutral reaction, and it is easily soluble in the usual organic solvents.

The same compound can be obtained by simple fusion of an equimolecular mixture of the two components.

Example 2

A solution of 244 parts by weight of 1-(3',4'-dimethyl - phenyl)-2-amino-propane-hydrobromide in 500 parts by volume of water is poured into a solution of 254 parts by weight of the sodium salt of 5-phenyl-5-ethyl-barbituric acid in 1200 parts by volume of water. The molecular compound which precipitates as an oil solidifies soon. After having been separated by filtration and dried at a temperature not higher than 50° C., it contains one molecule of water of crystallization and its melting point is 116–117° C. It may be recrystallized in dilute alcohol without its composition and melting point being changed.

Example 3

232 parts by weight of 5-phenyl-5-ethyl-barbituric acid are dissolved by heating in 1000 parts by volume of ethyl acetate. To the solution still warm are added 149 parts by weight of 1-phenyl-2-methylamino-propane. Upon cooling crystallization sets in soon. After standing in the cold for several hours the crystals are separated by filtration. The product obtained forms well developed crystals which are difficultly soluble in water, but easily soluble in the usual organic solvents, and which melt at 130–131° C.

*Example 4*

A solution of 149 parts by weight of 1-(4'-methyl-phenyl)-2-amino-propane and 232 parts by weight of 5-phenyl-5-ethyl-barbituric acid in 1000 parts by volume of methanol is diluted with water until it begins to become turbid, about 1500 parts by volume being needed therefor. The new compound crystallizes thereby and forms well developed colorless crystals which melt at 139–140° C.

I claim:
1. A stable homogenous compound containing in equimolecular proportions 5-phenyl-5-ethyl-barbituric acid and a base of the general formula

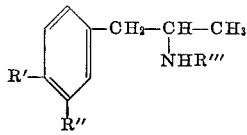

wherein R', and R'' and R''' stand for a member of the group consisting of hydrogen and methyl.

2. A stable homogenous compound consisting of equimolecular proportions of 5-phenyl-5-ethyl-barbituric acid and 1-phenyl-2-amino-propane.

3. A stable homogenous compound consisting of equimolecular proportions of 5-phenyl-5-ethyl-barbituric acid and 1-(3',4'-dimethyl-phenyl)-2-amino-propane.

4. A stable homogenous compound consisting of equimolecular proportions of 5-phenyl-5-ethyl-barbituric acid and 1-phenyl-2-methylamino-propane.

5. A stable homogenous compound consisting of equimolecular proportions of 5-phenyl-5-ethyl-barbituric acid and 1-(4'-methyl-phenyl)-2-amino-propane.

References Cited in the file of this patent

UNITED STATES PATENTS

| Number | Name | Date |
|---|---|---|
| 2,434,635 | Barrow | Jan. 20, 1948 |
| 2,515,898 | Rhodehamel, Jr. | July 18, 1950 |

OTHER REFERENCES

Cohen et al., Am. J. Psychiat 95, 371–387 (1938).

Meyerson, New Engl. J. Med. 221, 561-4 (1937).